UNITED STATES PATENT OFFICE.

GEORGE F. WILLIAMS, OF NEW PHILADELPHIA, OHIO.

MAKING BUTTER.

SPECIFICATION forming part of Letters Patent No. 358,097, dated February 22, 1887.

Application filed May 28, 1886. Serial No. 203,535. (No specimens.)

*To all whom it may concern:*

Be it known that I, GEORGE F. WILLIAMS, a citizen of the United States, residing at New Philadelphia, in the county of Tuscarawas and State of Ohio, have invented certain new and useful Improvements in Making Butter; and I do declare the following to be a full, clear, and exact description of the invention, such as will enable others skilled in the art to which it appertains to make and use the same.

This invention has for its object improvements in methods of making butter, whereby a superior quality of butter is obtained, and the butter made so that it will keep sweet longer than when treated by ordinary methods.

In carrying out my invention I use the ordinary cream or milk, sweet or sour.

I will describe my invention in its application to a single gallon of cream or milk. It will be understood that larger quantities of milk or cream are treated in the same way. The only difference is in the increased quantity of the carbonate of soda needed for the increased quantity of cream Take one gallon of cream or milk, sweet or sour, as in ordinary churning. Heat the milk to 110° Fahrenheit for thirty minutes. The heating is done preferably by means of hot water or steam surrounding the vessel containing the milk. The heating should be done as quickly as possible. Usually thirty minutes is long enough. To the gallon of warm milk add ten grains of carbonate of soda dissolved in one-half gill of tepid water. Cool the milk to 62° Fahrenheit, then churn it for a half-minute to thoroughly assimilate the carbonate of soda with the milk. In the cooled mass of milk put four pounds of butter previously softened by heat to the consistence of newly-churned butter. Before putting the butter in the milk, add and thoroughly mix with it one-half pound of salt. I prefer to put the salt in the butter before the latter is put in the milk; but the salt can be added after the butter is put in the milk. I have found that it is not absolutely necessary to mix them prior to churning. The softened and salted butter being now placed in the gallon of milk, it is churned by any well-known means till it is thoroughly mixed with the milk and is ready to gather, as in ordinary churning. At this stage I add thirty grains of carbonate of soda dissolved in one and a half gill of tepid water, after which the mass is churned to the finish, when the butter is removed and treated in the ordinary way—*i. e.*, kneaded and worked till the excess of salt and milk is expelled.

In carrying out my invention I do not limit myself to any particular kind of butter. Newly-made butter treated by my process will remain sweet for a great length of time, and rancid butter treated in a similar manner will be renovated and insured against a speedy deterioration. My method is especially adapted to curing rancid and strong butter, and making the same palatable to the most delicate taste. Thus butter rendered unfit generally for table use by long standing can be rescued and enhanced in value at a small outlay comparatively with the increase of the value of the product so treated.

The carbonate of soda has the effect to neutralize those substances which cause butter to deteriorate and grow rancid, and as a result the butter made by my process will keep sweet longer than when made by ordinary processes.

Having thus described my invention, what I claim, and desire to secure by Letters Patent, is—

The hereinbefore-described method of making butter, consisting of heating the milk, adding thereto carbonate of soda, cooling the mass, adding butter and salt thereto, churning the same, then adding additional carbonate of soda, churning the mass to the finish, removing the butter and working the same, substantially as set forth, for expelling the excess of salt and milk.

In testimony whereof I affix my signature in presence of two witnesses.

GEORGE F. WILLIAMS.

Witnesses:
   P. S. OLMSTEAD,
   WM. S. BAILEY.